US008252243B2

(12) United States Patent
Matveev

(10) Patent No.: US 8,252,243 B2
(45) Date of Patent: Aug. 28, 2012

(54) TRIPLE HELICAL FLOW VORTEX REACTOR IMPROVEMENTS

(76) Inventor: Igor Matveev, McLean, VA (US)

( * ) Notice: Subject to any disclaimer, the term of this patent is extended or adjusted under 35 U.S.C. 154(b) by 294 days.

(21) Appl. No.: 12/756,303

(22) Filed: Apr. 8, 2010

(65) Prior Publication Data

US 2011/0250098 A1 Oct. 13, 2011

(51) Int. Cl.
*B01J 19/08* (2006.01)
(52) U.S. Cl. .................... 422/186; 422/186.21; 422/224
(58) Field of Classification Search .................. 422/186, 422/224, 186.21
See application file for complete search history.

(56) References Cited

U.S. PATENT DOCUMENTS 3,324,334 A * 6/1967 Reed ........................ 313/231.31
7,176,427 B2 * 2/2007 Dalton .......................... 219/759
7,436,122 B1 * 10/2008 Beal et al. ................ 315/111.21
7,452,513 B2 * 11/2008 Matveev ....................... 422/186
* cited by examiner

*Primary Examiner* — Kishor Mayekar
(74) *Attorney, Agent, or Firm* — Louis Ventre, Jr.

(57) ABSTRACT

Improvements to a triple helical flow vortex reactor improve the radio-transparent portion of the reactor. A central part is added thereto consisting of an electrically conductive, non-magnetic material. A movable electrode configured to controllably extend into a zone, discharge and retract. A protrusion on the wall optionally aids in the discharge. A feedstock injection unit includes nested pipes: an outer pipe conveys coolants and the inner pipe conveys feedstock. An additional fuel inlet may be connected to an additional reaction chamber connected in series to the reaction chamber. The central part may be porous permitting inward flow of fuel. Slots penetrating the inner wall of the central part enhance the introduction of magnetic and electric fields. An outer shell over the reaction chamber is configured to flow coolant over the outer wall of the reaction chamber.

10 Claims, 2 Drawing Sheets

TRIPLE HELICAL FLOW VORTEX REACTOR IMPROVEMENTS

TECHNICAL FIELD

In the field of vortex flow field reaction motors, a reactor employing at least three helical flow vortexes in a reaction chamber in which a fuel is injected, mixed with an oxidizer and consumed during a combustion process.

BACKGROUND ART

The invention comprises improvements to a triple helical flow vortex reactor, which is fully described in U.S. Pat. No. 7,452,513, issued 18 Nov. 2008, (the '513 patent), which is hereby incorporated by reference herein.

Without repeating all of the explanation in that patent, it is necessary to describe the minimum components of a triple helical flow vortex reactor to give meaning and context to the improvements disclosed herein.

FIG. 1 shows a cross section of a triple helical flow vortex reactor (100) that includes improvements of the invention. A triple helical flow vortex reactor (100) comprises a reaction chamber (105) having a fuel inlet end (150) and a gas outlet end (160) at opposing axial ends of the reaction chamber (105), an inner wall (111) and an outer wall (112). The reaction chamber (105) is shown within the dashed enclosure. While the term fuel inlet end (150) is used, this end is also known as a fuel and reagents inlet end.

The triple helical flow vortex reactor (100) comprises a means to create fluid flow vortexes at the inner wall (111) that spiral towards each other from the ends of the reaction chamber (105). This means is a circumferential flow apparatus at each end and is discussed more fully in the '513 patent.

The triple helical flow vortex reactor (100) comprises a first circumferential fluid flow apparatus (115) fluidly connected to the reaction chamber (105) at the gas outlet end (160) for creating a circumferential fluid-flow first vortex (175) at the periphery of the reaction chamber (105) such that fluid-flow first vortex (175) spirals away from the gas outlet end (160).

The triple helical flow vortex reactor (100) comprises a second circumferential fluid flow apparatus (145) at the fuel inlet end (150) for creating a circumferential fluid-flow second vortex (170) at the periphery of the reaction chamber (105) in a direction reverse to the fluid flow first vortex (175). These two vortexes meet and create a mixing region where they meet.

The third vortex is typically induced by the swirling introduction of fuel, or a fuel and oxidizer mixture, into the reaction chamber (105).

The triple helical flow vortex reactor (100) used in the present invention is configured to include in the reaction chamber (105) a radio-transparent portion and to further comprise an electromagnetic wave generator (106). This electromagnetic wave generator (106) comprises a high frequency generator capable of creating electromagnetic waves at a plurality of frequencies selected from within a range of tens of kilohertz to thousands of gigahertz through radio-transparent portion; a wave guide; and an initiator within the reaction chamber. The improvements disclosed herein eliminate the need for a plasma generator in the electromagnetic wave generator described in the '513 patent.

As a standard industry practice, the conversion of standard/industrial low frequency (50-60 Hz) electrical power into a high frequency form (radio frequency or microwaves), would be accomplished using a high-frequency power supply. To transfer and feed high-frequency power into the reaction chamber, a wave guide or inductor would typically be used. Conventional wires and cables do not work. The typical practice is to match a high-frequency power supply output with the load and to accomplish this, a matching box is used. So, a conventional high-frequency system typically includes at least a high-frequency power supply, matching device (matching box), and waveguide or inductor.

When operating at a radio frequency wave band (preferably from 400 kHz to several dozen MHz) the waveguide is termed an "inductor" and is in the form of coil with several turns (normally from three to six) of copper tubing (¼" and up). A copper coil is as the cheapest non-magnetic coil with high electrical conductivity. A number of turns is defined to match the inductor's inductivity and electrical resistance, which provide matching with the high-frequency power supply output.

In case of higher frequency from hundreds to thousands of MHz (MW waveband), the waveguide could have either rectangle, square or ellipse configuration. These waveguides positioning relative to the reaction chamber in the present invention vary from perpendicular to co-axial. Number of waveguides could also vary from one to several.

SUMMARY OF INVENTION

Improvements to a triple helical flow vortex reactor are disclosed, which improve the radio-transparent portion of the reactor. A central part is added thereto consisting of an electrically conductive, non-magnetic material. Optionally, an initiator is added to this improvement, which is a movable electrode configured to controllably extend into a zone within the reaction chamber where maximal magnetic field density and maximum electric field density are present, and then discharge within the zone in order to create a plasma. The electrode is further configured to retract out of the zone. This electrode is preferably made of a material with low electron emission potential and a tip may be added to enhance the discharge. The reaction chamber wall may include discharge protrusion to aid in the discharge. A feedstock injection unit attached to the fuel inlet end of the reactor includes an inner pipe and, an outer pipe, nested coaxially. The outer pipe is configured to convey coolant around the outside of the inner pipe to cool the feedstock within. An additional fuel inlet may be connected to an additional reaction chamber connected serially to the reaction chamber. This additional fuel inlet is for injection of fuel at an angle to an axis of the additional reaction chamber. The central part of the radio-transparent portion may comprise a material that is porous to inward flow of fuel or a reagent. This enables the fuel and reagent to double as a wall coolant. This central part may also be configured to define slots penetrating the inner wall to enhance the introduction of magnetic and electric fields. An outer shell over the reaction chamber is configured to flow coolant over the outer wall of the reaction chamber.

Technical Problem

The triple helical flow vortex reactor utilizes inductively coupled plasma, which has low efficiency when adding energy to the reaction chamber by an external power source, such as radio-frequency generator or a microwave generator. Such additional energy is needed for applications such as waste processing and coal gasification. Coal gasification would work well with the addition of up to 15 kW per 1 gram per second for a coal fuel, depending on the gasification environment.

However, inductively coupled plasma devices have been generally bypassed because of low efficiency vacuum-tube-based power supplies, difficulties with discharge initiation at atmospheric pressure, and limited lifetime of the vacuum tubes.

The standard industry response has been to use a direct current plasma torch, widely adapted from technology of the 1960s and 1970s of last century.

Solution to Problem

The improvements make the triple helical flow vortex reactor an improved combustor. Combining contemporary solid state power supplies with properly engineered inductively coupled plasma torch with reverse vortex flow, that is, with a properly engineered triple helical flow vortex reactor, the device can have a near endless lifetime and total plasma generation efficiency from 70% to 80%, which is better than that for the best direct current plasma torch systems.

This invention is directed towards plasma chemical reactors using two or more reaction chambers for the triple helical flow vortex reactor. The first reaction chamber creates a first plasma generation section (i.e., a new inductively coupled plasma torch), the second reaction section and optionally the third one is used to add fuel and reagents.

The solution is a triple helical flow vortex reactor employed as an inductively coupled plasma torch/radio-frequency torch and categorized in the following groups:

Remote ignition or discharge initiation by retractable electrode;

Cooled radio-transparent section;

Waveguide configuration;

Power supply or high frequency generator; and,

Two-three co-axially adjoined triple helical flow reactors plus co-axial non-triple flow vortex reactor or vortex chamber

Advantageous Effects of Invention

The triple helical flow vortex reactor in application is an inductively coupled plasma torch/radio-frequency torch that has beneficial application to coal gasification and waste processing, among others.

BRIEF DESCRIPTION OF DRAWINGS

The drawings illustrate preferred embodiments of the method of the invention and the reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
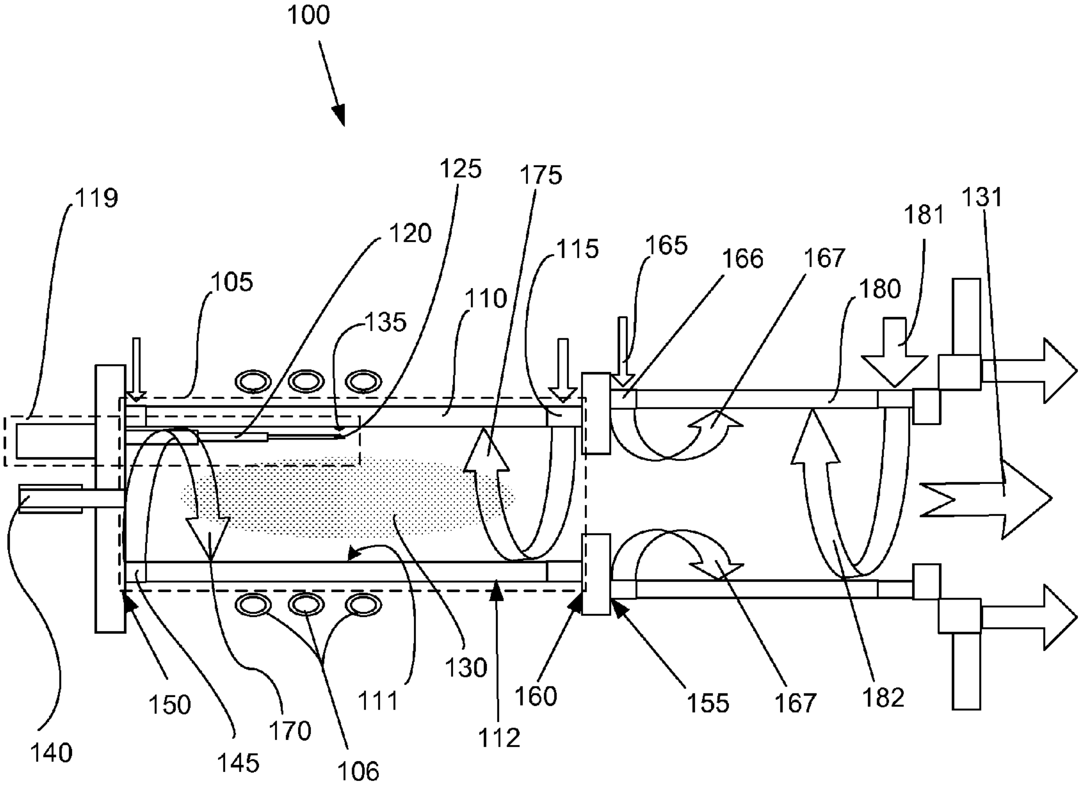
FIG. 1 is a cross-sectional view of a triple helical flow vortex reactor that includes improvements of the invention.

FIG. 1 shows improvements to the triple helical flow vortex reactor (100) and these relate to the radio-transparent portion. The radio-transparent portion of the wall may occupy a circumferential section of the reaction chamber wall and be any length along the reaction chamber. A first improvement comprises a central part (110) of the radio-transparent portion consisting of an electrically conductive non-magnetic material. Examples of such materials are aluminum, silver, bronze, and copper. The components that are adjacent to the radio-transparent section central part (110) are preferably non-magnetic. These include: the first circumferential fluid flow apparatus (115); the second circumferential flow apparatus (145); the fuel inlet end (150) of the reaction chamber (105); and the fuel and reagents inlet end (155) of an additional reaction chamber (180).

The improvement may further include an initiator (119), which is shown within the dashed enclosure. The initiator (119) is a movable electrode (120) configured to controllably extend into a zone within the reaction chamber, the zone comprising maximal magnetic field density and maximum electric field density; discharge within the zone for creating a plasma (130); and retract out of the zone subsequent to such discharge. Preferably, the movable electrode (120) is a rod with a metal tip (125) placed into the reaction chamber as close as possible to the inner wall (111) within this zone, also known as the inductor zone, to initiate a spark or other kind of gap ionization, which further leads to a plasma (130), or plasmoid, formation inside the triple helical flow vortex reactor (100), or if the triple helical flow vortex reactor (100) is configured as an inductively coupled torch, then inside the inductively coupled torch. A plasma plume (131) is shown exiting the triple helical flow vortex reactor (100).

After the discharge, the rod is then retracted to the fuel inlet end (150), that is, retracted out of the inductor zone. The initiator (119) may be powered by any of the known devices in the field, for example by a solenoid and air cylinder with long strokes, typically for an injection distance of about 2 to 8 inches. The rod should have a low electron emission potential and may be made from a non-magnetic material to avoid its heating while in the induction zone.

Thus, the movable electrode (120) preferably comprises a rod, the rod comprising a shaft having a low electron emission potential and a tip (125) selected from the group consisting of uranium, rubidium, potassium, cesium, hafnium, lanthanum, lithium, sodium, strontium, gallium barium, aluminum and carbon.

The initiator (119) should work at any position inside the magnetic and electric fields, even at the center of the reaction chamber (105). Preferably, however, the gap between the tip (125) of the rod to the reactor's inner wall (111) is preferably between 0.1 and 5 millimeters.

The improvement may further include a discharge protrusion (135) proximate to a central part of the reaction chamber (105), the protrusion (135) made of electrically conductive, non-magnetic material and configured to create a discharge point when approached by the retractable electrode. The selection of such material may be the same as for the tip (125) or central part (110) of the radio-transparent portion.

The improvement may further include a feedstock injection unit (140) attached to the fuel inlet end (150) along a central axis of the reaction chamber, the feedstock injection unit comprising an inner pipe (241) and an outer pipe (242), the inner pipe (241) nested coaxially within the outer pipe (242). The outer pipe (242) is configured to convey coolant around the inner pipe (241). The inner pipe (241) is configured to convey feedstock into the reaction chamber (105). The typical feedstock for any application of the feedstock injection unit (140) may be a powder of the material to be treated, powder fuel or a slurry made with the powder or powdered fuel. Examples of treatment applications where a powder of the material to be treated is used, include: melting operations for a variety of metals and materials; in-flight treatment and spheroidizing (densifying) materials such as metals (e.g., Ag, Al, B, Co, Cu, Mo, Nb, Re, Si, Ta, Ti, W, etc.); synthesizing alloys (e.g., Cr/Fe/C, Re/Mo, Re/W, Mg/Ni, etc.), treating ceramic oxides (e.g., SiO2, Al2O3, MgO, ZrO2, YSZ, Al2TiO5, Y2O3, CuO, glass, etc.), treating non-oxide ceramics (e.g., WC, WC—Co, CaF2, TiN, SiC, B4C, Si3N4, etc.). When such applications are involved, powders of the metals and material are preferable for operation of the feedstock injection unit (140), and more preferably nano-powders.

This type of feedstock injection unit (140) is useful for applications requiring high power density in the reaction chamber (105) because it can also provide cooling for the reaction chamber's cylindrical wall, fuel inlet end (150) and exit nozzle.

Figure 2:
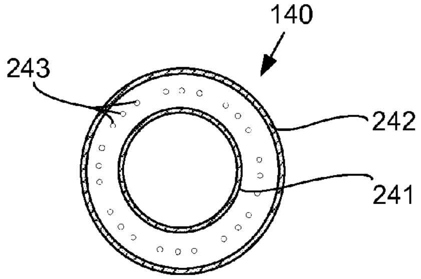
FIG. 2 is an end view of a feedstock injection unit.

Optionally, the coolant may be a gaseous or liquid reagent, water, or air which would then be in the form of air cooled heat exchanger for convection or forced-air cooling. Channels accessed by holes (243) in the feedstock injection unit (140) are for coolant and are shown in FIG. 2. Another anticipated application for the feedstock injection unit (140) is for feeding powders of nano-particles and special materials production. Preferably the feedstock injection unit is made with a non-magnetic material.

In applications involving the use of multiple reaction chambers as shown in FIG. 1, which are connected coaxially, end to end, such as in coal reactor applications, the second reaction chamber, also referred to as an additional reaction chamber (180) may include a second fuel stream injection, also referred to as an additional fuel inlet (165). For practical reasons, an injection port (166) injects the fuel stream (167) from the wall of the additional reaction chamber (180). Fuel injection may be directed in a stream that is perpendicular to the axis, or at any angle to the additional reaction chamber (180) axis.

The triple helical flow vortex reactor (100) application that includes a reaction chamber (105) that is a first reaction chamber; and a second or additional reaction chamber (180) is one where the additional reaction chamber (180) co-axially adjoins the reaction chamber (105). Both reaction chambers are fluidly connected together in series, such that the gas outlet end of the reaction chamber (105) reactor adjoins the fuel and reagents inlet end (155) of the additional reaction chamber (180). In this application, the improvement further comprises an additional fuel inlet (165) connected to the additional reaction chamber (180) for injection of fuel at an angle to the axis of the additional reaction chamber (180). A shielding and transporting gas (181) may be injected with a circumferential fluid flow apparatus, or other any other gas promoting the particular application. This creates a transporting gas reverse vortex (182) in the additional reaction chamber (180).

The improvement may further include limitation on the structure of the radio-transparent portion to enable inward flow of gaseous or liquid fuel through its wall and into the reaction chamber (105). The further limitation is that the central part (110) of the radio-transparent portion comprises a wall material that is porous to inward flow of fuel or a reagent.

A porous wall material can mitigate requirements for water cooling, simplify the design, and increase the reactor's thermal efficiency. With a porous wall material, the main gas flow in the reaction chamber (105) can comprise two streams. A first stream comprises the fluid-flow first vortex (175), that is, a tangential flow originating from the first circumferential fluid flow apparatus (115). A second stream comprises a cooling stream, which goes through the porous wall, cools the porous wall by absorbing heat, enters the reaction chamber (105), and mixes with the first stream.

Figure 3:
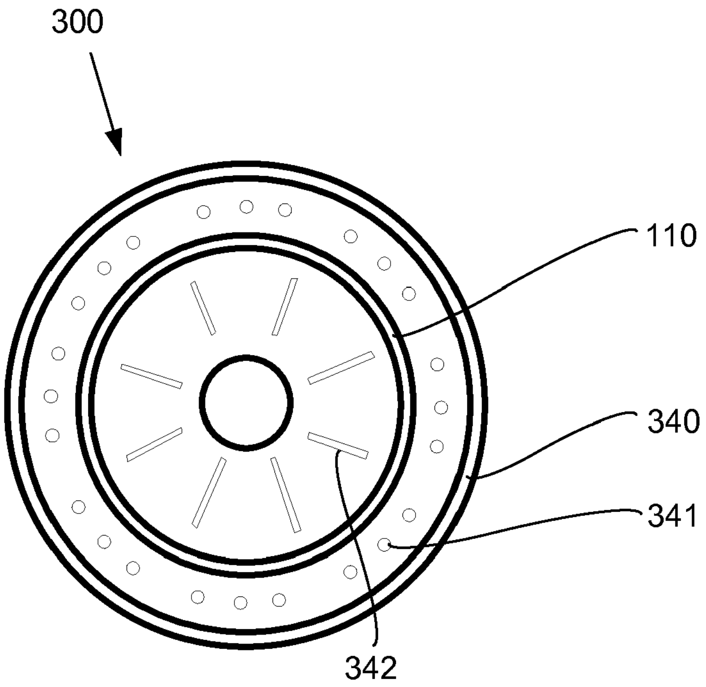
FIG. 3 is an end-perspective skewed to show the inside of an alternative reaction chamber configured with improvements.
Figure 4:
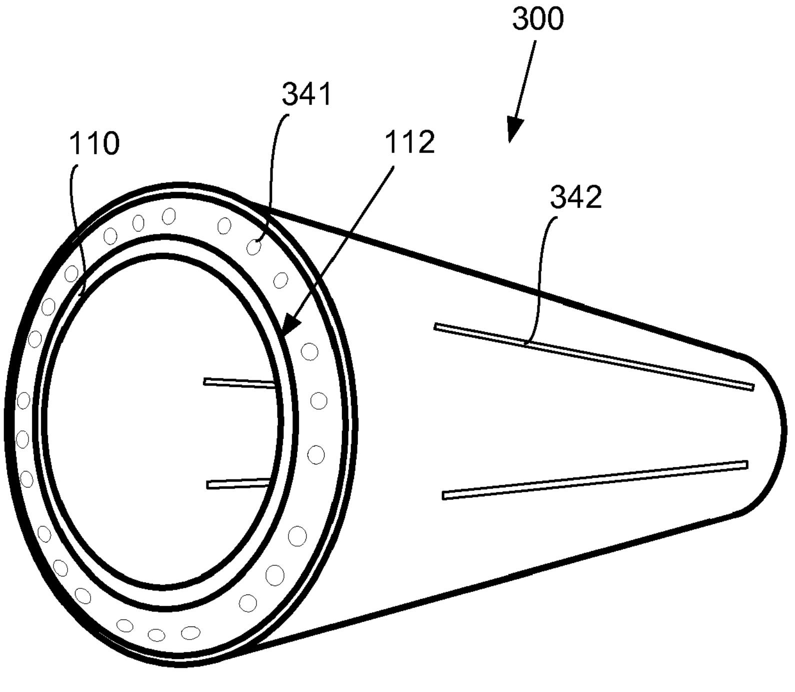
FIG. 4 is a perspective of the alternative reaction chamber shown in FIG. 3.

The improvement may further include a configuration of the radio transparent portion that promotes electromagnetic field penetration inside the reaction chamber. FIG. 3 illustrates an alternative reaction chamber (300) incorporating this improvement. For this purpose, the central part (110) of the radio transparent portion is configured to define slots (342) penetrating the inner wall (111) from outside the reaction chamber (105), the slots (342) are configured to be parallel to a central axis of the reaction chamber (105) and provide unimpeded access to the plasma (130) for the introduction energy from electro-magnetic fields.

This improvement may further include an outer shell (340) over the reaction chamber (105) to enable cooling and provide gas/liquid sealing. This arrangement is essentially coaxial tubes wherein the reaction chamber (105) is the inner tube and the outer shell (340) is the outer tube. Holes (341) at the ends enable coolant, e.g. water, to flow in over the outer wall (112) of the reaction chamber (105) and out the other end. The outer shell (340) seals the reaction chamber (105), which avoids plasma and gas leaks through the slots. The outer shell (340) also provides electrical insulation between the reaction chamber (105) and a waveguide. The outer shell (340) is preferably radio-transparent. Examples of a preferred outer shell (340) are a quartz tube and a ceramic tube.

Where the reaction chamber is configured with slots (342), the slots (342) are sealed off from the coolant. Thus, the improvement may further comprise an outer shell (340) configured to flow coolant over the outer wall (112) of the reaction chamber, which in this embodiment is the additional reaction chamber (180). When the central part (110) is porous, the coolant may be fuel and reagents.

The improvement may further include a radiation reflective coating applied to inner wall (111). This coating is similar to a mirror in that it reduces heat loss by reflection of the radiation energy back into the central part of the reaction chamber. Examples of such coatings are metal-type coatings, e.g. silver-based and other conductive high temperature alloys. The coating should preferably comprise non-magnetic materials.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

Industrial Applicability

The invention has application to the power industry.

What is claimed is:

1. An improvement to a triple helical flow vortex reactor, the triple helical flow vortex reactor comprising a reaction chamber having a fuel inlet end; a gas outlet end at opposing axial ends of the reaction chamber; an inner wall; an outer wall; and an electromagnetic wave generator; wherein the reaction chamber comprises a radio-transparent portion that occupies a circumferential section of the reaction chamber wall, the improvement comprising a central part of the radio-transparent portion, said central part consisting of an electrically conductive, non-magnetic material.

2. The improvement of claim 1, further comprising an initiator, the initiator comprising a movable electrode configured to:

controllably extend into a zone within the reaction chamber, the zone comprising maximal magnetic field density and maximum electric field density;

discharge within the zone for creating a plasma; and retract out of the zone subsequent to such discharge.

3. The improvement of claim 2, wherein the movable electrode comprises a material with low electron emission potential and a tip selected from the group consisting of uranium, rubidium, potassium, cesium, hafnium, lanthanum, lithium, sodium, strontium, gallium, barium, aluminum and carbon.

4. The improvement of claim 2 further comprising a discharge protrusion proximate to a central part of the reaction chamber, the protrusion made of electrically conductive, non-magnetic material and configured to create a discharge point when approached by the retractable electrode.

5. The improvement of claim 1, further comprising a feedstock injection unit attached to the fuel inlet end along a central axis of the reaction chamber, the feedstock injection unit comprising an inner pipe and, an outer pipe, the inner pipe nested coaxially within the outer pipe, the outer pipe configured to convey coolant around the inner pipe, and the inner pipe configured to convey feedstock into the reaction chamber; wherein the feedstock is selected from the group consisting of a powdered material to be treated, powder fuel and a slurry made with the powdered fuel.

6. The improvement of claim 1, wherein the triple helical flow vortex reactor further comprises an additional reaction chamber co-axially adjoining the reaction chamber, wherein the reaction chamber and the additional reaction chamber are fluidly connected together in series, such that the gas outlet end of the reaction chamber adjoins the fuel and reagents inlet end of the additional reaction chamber, wherein the improvement further comprises an additional fuel inlet connected to the additional reaction chamber for injection of fuel at an angle to an axis of the additional reaction chamber.

7. The improvement of claim 1, wherein the central part of the radio-transparent portion comprises a material that is porous to inward flow of fuel or a reagent.

8. The improvement of claim 1, wherein the central part defines slots penetrating the inner wall from outside the reaction chamber, the slots configured parallel to a central axis of the reaction chamber.

9. The improvement of claim 1, wherein the reaction chamber further comprises an outer shell configured to flow coolant over the outer wall of the reaction chamber.

10. The improvement of claim 1, further comprising a radiation reflective coating applied to inner wall.

* * * * *